(12) United States Patent
Tsai (10) Patent No.: US 10,601,321 B2
(45) Date of Patent: Mar. 24, 2020

(54) DC-DC CONVERTING CONTROLLER FOR REDUCING TRANSMISSION DELAY ERROR DURING ZERO-CURRENT DETECTION AND OPERATING METHOD THEREOF

(71) Applicant: uPI semiconductor corp., Zhubei, Hsinchu County (TW)

(72) Inventor: Yu-Chu Tsai, Zhubei (TW)

(73) Assignee: UPI SEMICONDUCTOR CORP., Zhubei, Hsinchu County (TW)

( * ) Notice: Subject to any disclaimer, the term of this patent is extended or adjusted under 35 U.S.C. 154(b) by 36 days.

(21) Appl. No.: 16/285,442

(22) Filed: Feb. 26, 2019

(65) Prior Publication Data

US 2019/0296640 A1    Sep. 26, 2019

(30) Foreign Application Priority Data

Mar. 20, 2018    (TW) .............................. 107109494 A (51) Int. Cl.
*H02M 3/158* (2006.01)
*H02M 1/08* (2006.01)
*H02M 1/00* (2006.01)

(52) U.S. Cl.
CPC ........... *H02M 3/158* (2013.01); *H02M 1/083* (2013.01); *H02M 2001/0009* (2013.01)

(58) Field of Classification Search
CPC ............. H02M 3/335; H02M 3/33507; H02M 3/157–1588; H02M 2001/0012
See application file for complete search history.

(56) References Cited

U.S. PATENT DOCUMENTS

| | | | |
|---|---|---|---|
| 7,652,945 B2 | 1/2010 | Chu et al. | |
| 7,940,596 B2 | 5/2011 | Chu et al. | |
| 8,253,507 B2* | 8/2012 | Tang | H02M 3/1588 323/285 |
| 8,786,267 B2 | 7/2014 | Lu et al. | |
| 9,013,164 B1* | 4/2015 | Lee | H02M 3/158 323/285 |
| 9,350,347 B2* | 5/2016 | Lee | H03K 19/0013 |
| 2004/0124818 A1* | 7/2004 | Dequina | H02M 1/36 323/282 |

(Continued)

*Primary Examiner* — Kyle J Moody
*Assistant Examiner* — Nusrat Quddus
(74) *Attorney, Agent, or Firm* — McClure, Qualey & Rodack, LLP (57) ABSTRACT

A DC-DC converting controller, coupled to an output stage including a phase node and an operation switch coupled between the phase node and a ground voltage, includes a pulse-width modulation (PWM) unit, a zero-level comparator and a threshold voltage generation unit. The PWM unit, coupled to the output stage, provides the PWM signal to the output stage for controlling the operation switch. The zero-level comparator has a first input terminal, a second input terminal and an output terminal. The first input terminal is coupled to the phase node. The output terminal, coupled to the PWM unit, provides a zero-current voltage to adjust the PWM signal. The threshold voltage generation unit, coupled to the phase node and zero-level comparator, provides the threshold voltage to the second input terminal. The threshold voltage generation unit dynamically adjusts threshold voltage according to a default voltage and the phase voltage on the phase node.

8 Claims, 7 Drawing Sheets

(56) References Cited

U.S. PATENT DOCUMENTS

| | | | | |
|---|---|---|---|---|
| 2005/0128776 A1* | 6/2005 | Dequina | ............... | H02M 1/088 |
| | | | | 363/89 |
| 2006/0273772 A1* | 12/2006 | Groom | ................. | H02M 3/157 |
| | | | | 323/284 |
| 2008/0246455 A1* | 10/2008 | Chu | .................... | H02M 3/1588 |
| | | | | 323/283 |
| 2009/0027020 A1* | 1/2009 | Qiu | .................... | H02M 3/1588 |
| | | | | 323/282 |
| 2009/0027024 A1* | 1/2009 | Dequina | ................ | H02M 1/38 |
| | | | | 323/283 |
| 2009/0027027 A1* | 1/2009 | Lin | ...................... | H02M 3/158 |
| | | | | 323/285 |
| 2009/0108826 A1* | 4/2009 | Solie | ................... | H02M 3/156 |
| | | | | 323/288 |
| 2009/0323375 A1* | 12/2009 | Galvano | .............. | H02M 3/156 |
| | | | | 363/21.06 |
| 2010/0283441 A1* | 11/2010 | Wang | ..................... | H02M 1/14 |
| | | | | 323/282 |
| 2010/0320983 A1* | 12/2010 | Wu | ...................... | H02M 3/156 |
| | | | | 323/283 |
| 2011/0260703 A1* | 10/2011 | Laur | .................. | H02M 3/1563 |
| | | | | 323/271 |

* cited by examiner

DC-DC CONVERTING CONTROLLER FOR REDUCING TRANSMISSION DELAY ERROR DURING ZERO-CURRENT DETECTION AND OPERATING METHOD THEREOF

BACKGROUND OF THE INVENTION

1. Field of the Invention

The invention relates to power conversion; in particular, to a DC-DC converting controller and an operating method thereof.

2. Description of the Prior Art

When the conventional DC-DC converting controller performs zero-current (ZC) detection, its possible error source includes the transmission delay error during signal transmission in addition to the error of the comparator itself. Although there are many ways to improve the error of the comparator itself, the transmission delay error cannot be effectively improved. Especially in the case that high-frequency applications are becoming more and more popular in the future, the impact caused by the transmission delay errors will inevitably become larger.

Figure 1:
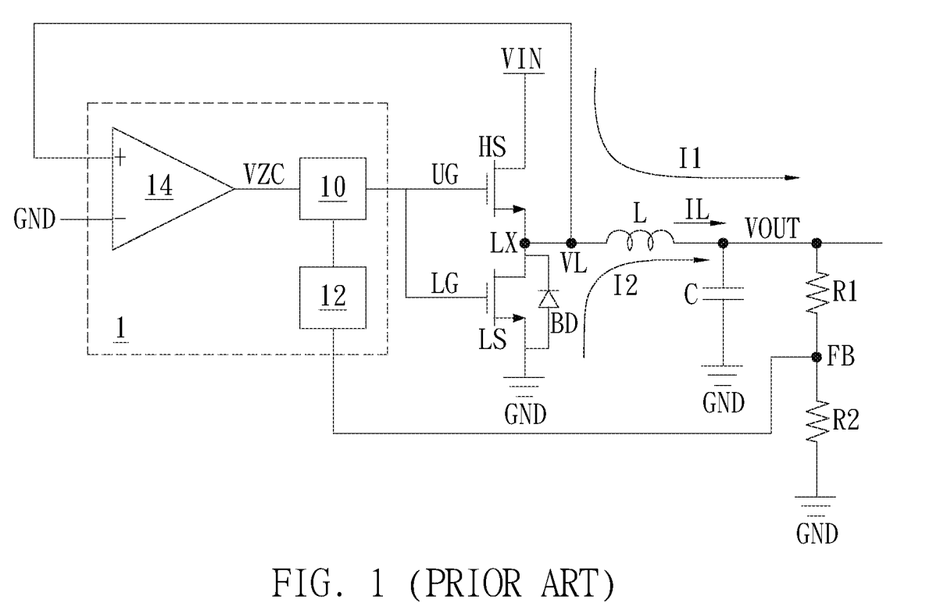
FIG. 1 and FIG. 2 illustrate schematic diagrams of an ideal DC-DC converting controller 1 and its converted waveform respectively.
Figure 2:
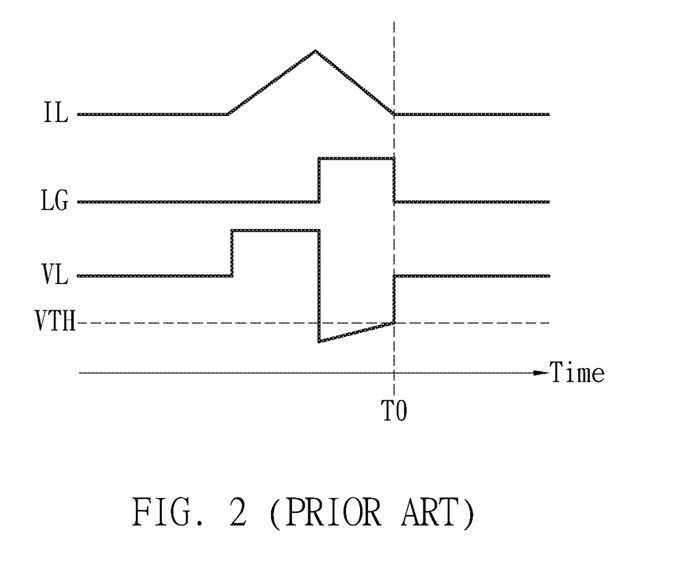

FIG. 1 and FIG. 2 illustrate schematic diagrams of an ideal DC-DC converting controller 1 and its converted waveform respectively. In an ideal case, when the pulse width modulation (PWM) signal LG turns on the lower bridge switch LS, the curve of the inductor current IL decreases; when the inductor current IL drops to zero at the time T0, the PWM signal LG turns off the lower bridge switch LS.

Figure 3A:
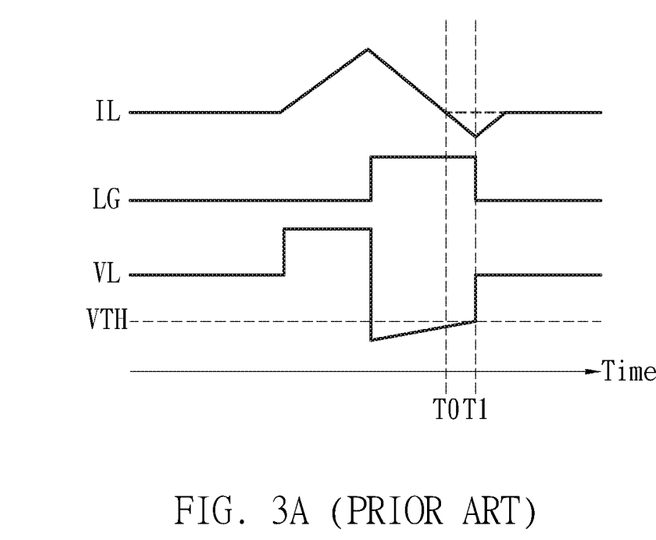
FIG. 3A illustrates a schematic diagram of the converted waveform with positive transmission delay error.
Figure 3B:
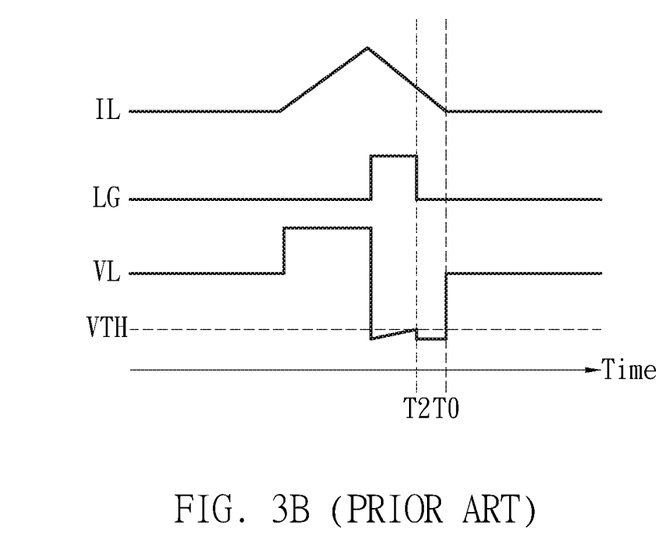
FIG. 3B illustrates a schematic diagram of the converted waveform with negative transmission delay error.

Compared to the ideal conversion waveform shown in FIG. 2, FIG. 3A illustrates a schematic diagram of the converted waveform with positive transmission delay error. As shown in FIG. 3A, when the off-time T1 of the lower bridge switch LS is later than the ideal off-time T0, a current opposite to the direction of the current I2 is generated on the output inductor L, resulting in excess power loss; FIG. 3B illustrates a schematic diagram of the converted waveform with negative transmission delay error. When t the off-time T2 of the lower bridge switch LS is earlier than the ideal off-time T0, the body diode BD of the lower bridge switch LS is turned on to maintain the continuous inductor current IL on the output inductor L, but it also results in excess power loss.

SUMMARY OF THE INVENTION

Therefore, the invention provides a DC-DC converting controller and an operating method thereof to effectively solve the above-mentioned problems in the prior art.

An embodiment of the invention is a DC-DC converting controller. In this embodiment, the DC-DC converting controller is coupled to an output stage. The output stage includes a phase node and an operation switch. The operation switch is coupled between the phase node and a ground voltage. The DC-DC converting controller includes a pulse-width modulation (PWM) unit, a zero-level comparator and a threshold voltage generation unit. The PWM unit is coupled to the output stage and provides the PWM signal to the output stage for controlling the operation switch. The zero-level comparator has a first input terminal, a second input terminal and an output terminal. The first input terminal is coupled to the phase node. The output terminal is coupled to the PWM unit and provides a zero-current voltage to adjust the PWM signal. The threshold voltage generation unit is coupled to the phase node and zero-level comparator and provides the threshold voltage to the second input terminal. The threshold voltage generation unit dynamically adjusts threshold voltage according to a default voltage and the phase voltage on the phase node.

In an embodiment of the invention, the threshold voltage generation unit includes a sampling unit, a comparator and a zero-current controller, the PWM signal controls the operation switch to be periodically turned on and off, the threshold voltage generation unit selectively adjusts the threshold voltage of a second period according to the phase voltage on the phase node during a first period, and the second period is later than the first period.

In an embodiment of the invention, when the phase voltage of the first period is greater than the default voltage, decreasing the threshold voltage of the second period.

In an embodiment of the invention, the phase voltage of the first period is smaller than the default voltage, the threshold voltage of the second period increases.

Another embodiment of the invention is a DC-DC converting controller operating method. In this embodiment, the DC-DC converting controller operating method is used for operating a DC-DC converting controller. The DC-DC converting controller is coupled to an output stage. The output stage includes a phase node and an operation switch. The operation switch is coupled between the phase node and a ground voltage. The DC-DC converting controller operating method includes: (a) providing a PWM signal to the operation switch; (b) providing a zero-current voltage according to a phase voltage on the phase node and a threshold voltage to adjust the PWM signal; and (c) dynamically adjusting the threshold voltage according to a default voltage and the phase voltage.

Compared to the prior art, the DC-DC converting controller and the operation method thereof according to the invention dynamically adjust the zero-current voltage of the next period according to the results of comparing the phase voltage on the phase node during the previous period with the default voltage, so that the transmission delay error during zero-current detection can be improved, and the power loss due to the too early or too late off-time of the switch in the prior art can be avoided; therefore, the ideal zero-current detection mechanism can be realized.

The advantage and spirit of the invention may be understood by the following detailed descriptions together with the appended drawings.

DETAILED DESCRIPTION OF THE INVENTION

Exemplary embodiments of the invention are referenced in detail now, and examples of the exemplary embodiments are illustrated in the drawings. Further, the same or similar reference numerals of the elements/components in the drawings and the detailed description of the invention are used on behalf of the same or similar parts.

Figure 4:
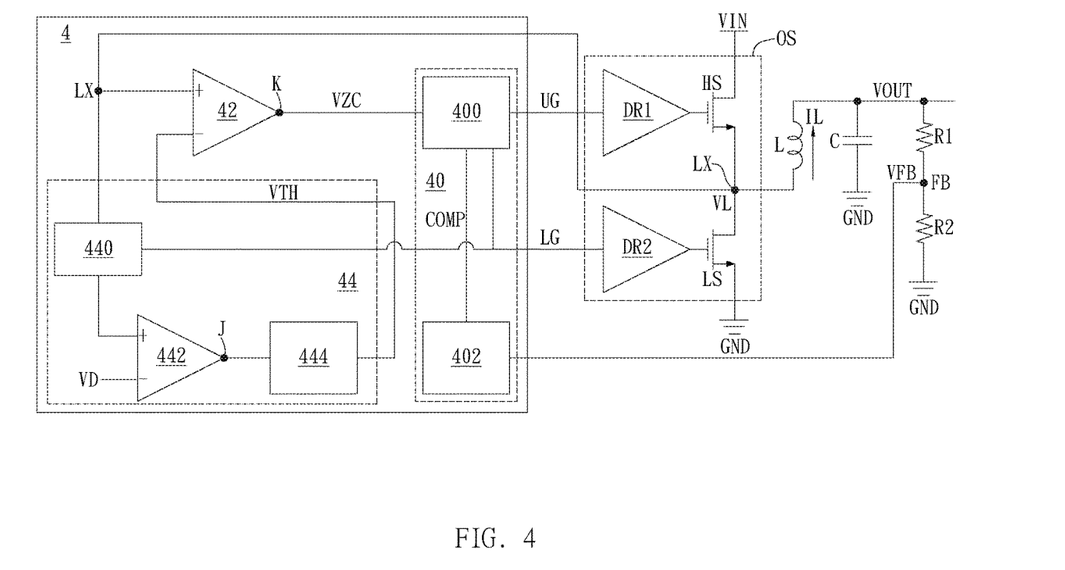
FIG. 4 illustrates a schematic diagram of the DC-DC converting controller in an embodiment of the invention.

An embodiment of the invention is a DC-DC converting controller. In this embodiment, the DC-DC converting controller can be applied to the DC-DC buck converting circuit, but not limited to this. Please refer to FIG. 4. FIG. 4 illustrates a schematic diagram of the DC-DC converting controller in this embodiment.

As shown in FIG. 4, the DC-DC converting controller 4 is coupled to the output stage OS. The output stage OS includes drivers DR1~DR2, an operation switch HS, an operation switch LS and a phase node LX. The driving switches DR1~DR2 are coupled to gates of the operation switches HS and LS respectively; the operation switch HS is coupled between an input voltage VIN and the phase node LX; the operation switch LS is coupled between the phase node LX and a ground voltage GND. The phase node LX is coupled between the operation switch HS and the operation switch LS. And, the phase node LX is also coupled between the DC-DC converting controller 4 and an output inductor L. The output capacitor C is coupled between the output voltage VOUT and the ground voltage GND. The voltage dividing resistors R1 and R2 are coupled in series between the output voltage VOUT and the ground voltage GND. A feedback node FB located between the voltage dividing resistors R1 and R2 is coupled to the DC-DC converting controller 4, and a feedback voltage VFB on the feedback node FB is related to the output voltage VOUT.

The DC-DC converting controller 4 includes a PWM unit 40, a zero-level comparator 42 and a threshold voltage generation unit 44. The zero-level comparator 42 has a positive input terminal +, a negative input terminal − and an output terminal K. The PWM unit 40 is coupled to the output terminal K of the zero-level comparator 42, the output stage OS and the feedback node FB respectively; the positive input terminal + and the negative input terminal − of the zero-level comparator 42 are coupled to the phase node LX and the threshold voltage generation unit 44 respectively; the output terminal K of the zero-level comparator 42 is coupled to the PWM unit 40; the threshold voltage generation unit 44 is coupled to the phase node LX, the negative input terminal − of the zero-level comparator 42 and the output stage OS respectively.

The PWM unit 40 is used to provide PWM signals UG and LG to the output stage OS respectively. The drivers DR1~DR2 in the output stage OS control operations of the operation switches HS and LS according to the PWM signals UG and LG respectively. The PWM unit 40 can include a PWM controller 400 and a compensation unit 402. The PWM controller 400 is coupled to the output terminal K of the zero-level comparator 42, the compensation unit 402 and the output stage OS respectively and used for providing the PWM signals UG and LG to the gates of the operation switches HS and LS of the output stage OS respectively. The compensation unit 402 is coupled to the PWM controller 400 and the feedback node FB respectively and used for receiving the feedback voltage VFB on the feedback node FB between the voltage dividing resistors R1 and R2 and providing a compensation signal COMP to the PWM controller 400 according to the feedback voltage VFB related to the output voltage VOUT. The PWM controller 400 can selectively adjust the PWM signals UG and LG outputted to the operation switches HS and LS of the output stage OS according to the compensation signal COMP related to the output voltage VOUT.

The positive input terminal + of the zero-level comparator 42 is used for receiving the phase voltage VL on the phase node LX; the negative input terminal − of the zero-level comparator 42 is used for receiving the threshold voltage VTH provided by the threshold voltage generation unit 44. The zero-level comparator 42 generates a zero-current voltage VZC according to the comparing result between the phase voltage VL and the threshold voltage VTH, and provides the zero-current voltage VZC to the PWM controller 400 of the PWM unit 40 through its output terminal K. The PWM controller 400 can selectively adjust the PWM signals UG and LG outputted to the operation switches HS and LS of the output stage OS according to the zero-current voltage VZC.

The threshold voltage generation unit 44 is used to provide the threshold voltage VTH to the negative input terminal − of the zero-level comparator 42 according to the phase voltage VL on the phase node LX and the default voltage VD. The threshold voltage generation unit 44 can include a sampling unit 440, a comparator 442 and a zero-current controller 444. The comparator 442 has a positive input terminal +, a negative input terminal − and an output terminal J. The sampling unit 440 is coupled to the phase node LX, the positive input terminal + of the comparator 442 and the gate of the operation switch LS. The positive input terminal + and the negative input terminal − of the comparator 442 are coupled to the sampling unit 440 and the default voltage VD respectively. The output terminal J of the comparator 442 is coupled to the zero-current controller 444. The zero-current controller 444 is coupled to the output terminal J of the comparator 442 and the negative input terminal − of the zero-level comparator 42 respectively.

The sampling unit 440 will continuously detect the falling edge of the PWM signal LG provided by the PWM unit 40 to the gate of the operation switch LS; that is to say, the sampling unit 440 continuously detects whether the PWM signal LG is changed from high-level to low-level.

When the sampling unit 440 detects that the PWM signal LG is changed from high-level to low-level (e.g., the first period), the sampling unit 440 will sample the phase voltage VL on the phase node LX and provide the phase voltage VL to the positive input terminal + of the comparator 442. The comparator 442 will compare the phase voltage VL with the preset voltage VD and provide the comparing result to the zero-current controller 444, and the zero-current controller 444 will selectively adjust the threshold voltage VTH provided to the negative input terminal − of the zero potential comparator 42 during the next period (e.g., the second period) according to the comparing result of the comparator 442 to reduce error to realize the ideal zero-current detection mechanism.

Figure 5:
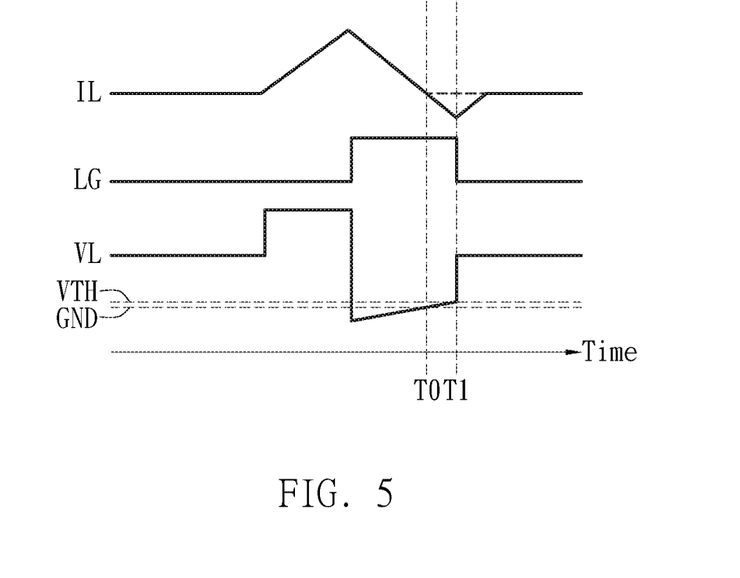
FIG. 5 illustrates a timing diagram of the converted waveform when the off-time of the operation switch is later than the ideal off-time.

As shown in FIG. 5, it is assumed that the default voltage VD is the ground voltage GND. If the PWM signal LG is changed from high-level to low-level at a time T1 later than the ideal off-time T0, the phase voltage VL on the phase node LX will still continuously increase after the ideal off-time T0, so that the phase voltage VL sampled by the sampling unit 440 at the time T1 will be greater than the ground voltage GND. Therefore, the zero-current controller 444 will lower the threshold voltage VTH for the next period according to this comparing result, so that the PWM signal LG will be changed from high-level to low-level earlier during the next period, and the off-time of the operation switch LS during the next period will be closer to the ideal off-time T0 to reduce error.

Figure 6:
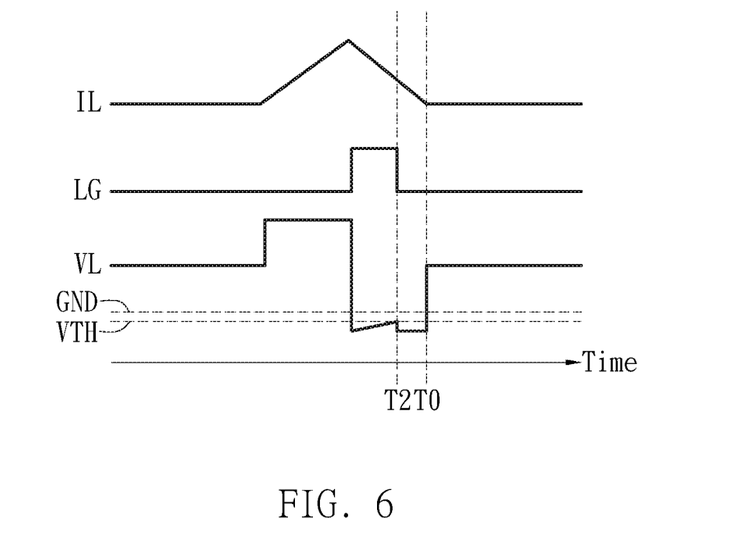
FIG. 6 illustrates a timing diagram of the converted waveform when the off-time of the operation switch is earlier than the ideal off-time.

As shown in FIG. 6, it is assumed that the default voltage VD is the ground voltage GND. If the PWM signal LG is changed from high-level to low-level at a time T2 earlier than the ideal off-time T0, the operation switch LS is turned off when the phase voltage VL on the phase node LX has not risen to the ground voltage GND, so that the phase voltage VL sampled by the sampling unit 440 at the time T2 will be smaller than the ground voltage GND. Therefore, the zero-current controller 444 will increase the threshold voltage VTH for the next period according to this comparing result, so that the time that the PWM signal LG is changed from high-level to low-level will be delayed during the next period, and the off-time of the operation switch LS during the next period will be closer to the ideal off-time T0 to reduce error.

As described above, if the phase voltage VL sampled by the sampling unit 440 is equal to the ground voltage GND, it means that the operation switch LS is turned off at the ideal off-time T0. Therefore, the zero-current controller 444 will not adjust the threshold voltage VTH of the next period according to this comparing result, so that the off-time of the operation switch LS during the next period can remain at the ideal off-time T0 unchanged.

Figure 7:
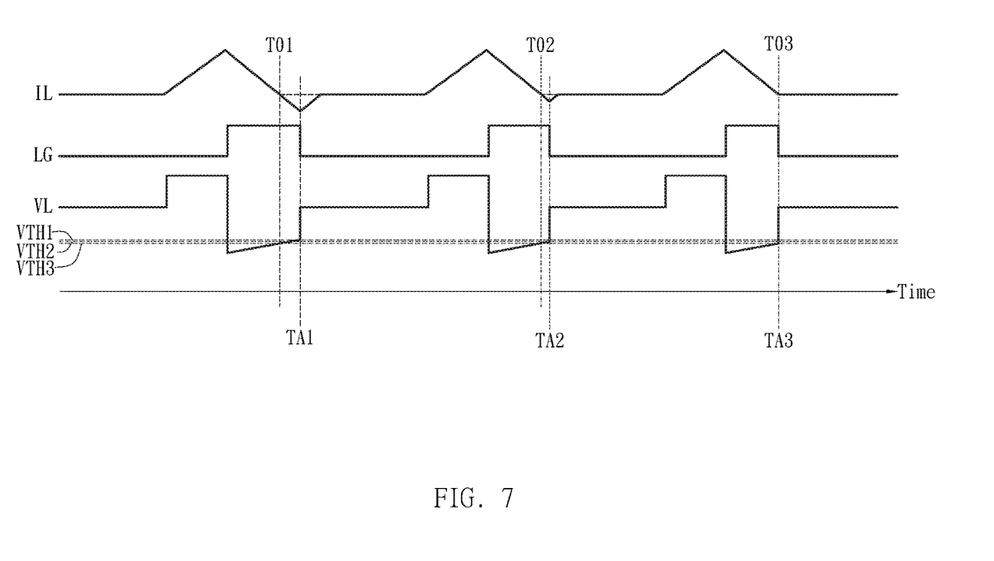
FIG. 7 illustrates a timing diagram of the continuous converted waveform when the off-time of the operation switch is later than the ideal off-time.

Please refer to FIG. 7. FIG. 7 illustrates a timing diagram of the continuous converted waveform when the off-time of the operation switch is later than the ideal off-time. As shown in FIG. 7, it is assumed that the ideal off-times of the operation switch LS of the first period~the third period are T01~T03 respectively, and the default voltage VD is the third threshold voltage VTH3.

During the first period, if the phase voltage VL sampled by the sampling unit 440 when the PWM signal LG is changed from high-level to low-level (e.g., the time TA1) is VTH1 which is greater than the default voltage VD (e.g., the third threshold voltage VTH3 in this case), it means that the operation switch LS is turned off too late, so that the phase voltage VL on the phase node LX will continue to rise after the ideal off-time T01 to be greater than the default voltage VD. The zero-current controller 444 will decrease the threshold voltage VTH of the second period to, for example, the second threshold voltage VTH2 according to the comparing result that the phase voltage VL (e.g., the first threshold voltage VTH1) is greater than the default voltage VD (e.g., the third threshold voltage VTH3).

During the second period, the PWM signal LG is earlier changed from high-level to low-level at the off-time TA2 to turn off the operation switch LS. Similarly, if the phase voltage VL sampled at the time TA2 is the second threshold voltage VTH2 which is greater than the default voltage VD (e.g., the third threshold voltage VTH3 in this case), the zero-current controller 444 will decrease the threshold voltage VTH of the third period to, for example, the third threshold voltage VTH3 according to the comparing result that the phase voltage VL (e.g., the second threshold voltage VTH2) is greater than the default voltage VD (e.g., the third threshold voltage VTH3). Although the off-time TA2 of the operation switch LS of the second period is still slightly later than the ideal off-time T02 of the second period, it has approached the ideal off-time more than that of the first period.

Therefore, during the third period, the zero-current controller 444 decreases the threshold voltage of the third period to, for example, the third threshold voltage VTH3, according to the comparing result that the phase voltage VL (e.g., the second threshold voltage VTH2) is greater than the default voltage VD (e.g., the third threshold voltage VTH3), so that the falling edge of the PWM signal LG will earlier occur at the off-time TA3. Since the off-time TA3 of the operation switch LS of the third period is equal to the ideal off-time T03 of the third period, the error can be effectively minimized.

It can be obtained from the above that when the off-time of the operation switch LS is later than the ideal off-time of the first period, the zero-current controller 444 will continuously decrease the threshold voltage during the following second period and third period, according the comparing result that the phase voltage VL is greater than the default voltage VD, that is, the second threshold voltage VTH2 is smaller than the first threshold voltage VTH1 and the third threshold voltage VTH3 is smaller than the second threshold voltage VTH2 until the phase voltage VL is equal to the default voltage VD.

Figure 8:
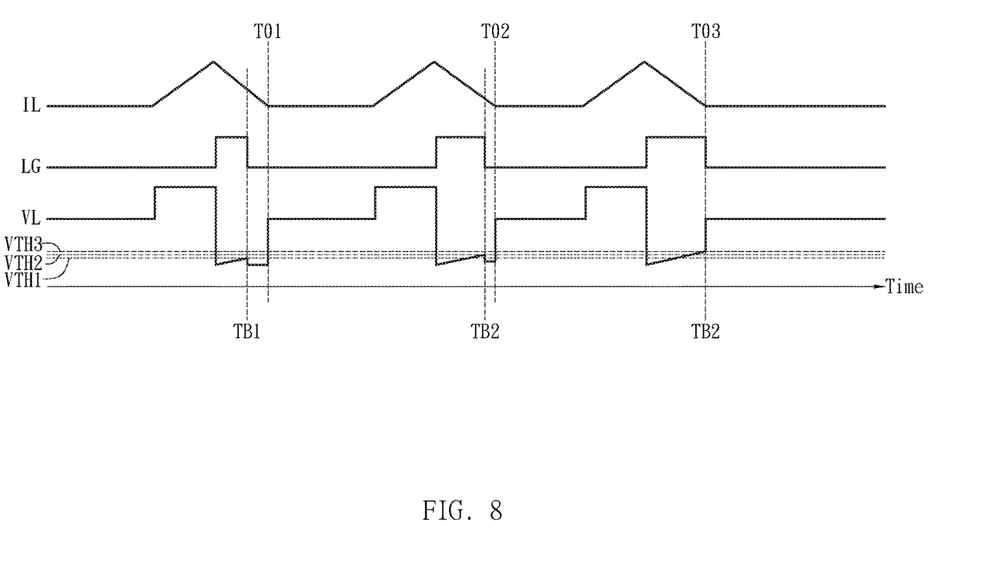
FIG. 8 illustrates a timing diagram of the continuous converted waveform when the off-time of the operation switch is earlier than the ideal off-time.

Please refer to FIG. 8. FIG. 8 illustrates a timing diagram of the continuous converted waveform when the off-time of the operation switch is earlier than the ideal off-time. As shown in FIG. 8, it is assumed that the ideal off-times of the operation switch LS of the first period~the third period are T01~T03 respectively.

During the first period, if the phase voltage VL sampled by the sampling unit 440 when the PWM signal LG is changed from high-level to low-level (e.g., the time TB1) is the first threshold voltage VTH1 and the default voltage VD is the third threshold voltage VTH3, and VTH1<VTH3, it means that the operation switch LS is turned off before the phase voltage VL on the phase node LX has risen to the default voltage VD. At this time, the zero-current controller 444 will increase the threshold voltage of the second period to, for example, the second threshold voltage VTH2 according to the comparing result that the phase voltage VL (e.g., the first threshold voltage VTH1) is smaller than the default voltage VD (e.g., the third threshold voltage VTH3).

During the second period, the PWM signal LG is delayed to be changed from high-level to low-level at the off-time TB2 to turn off the operation switch LS. Similarly, if the phase voltage VL sampled at the off-time TB2 is the second threshold voltage VTH2 and the default voltage VD is the third threshold voltage VTH3, the zero-current controller 444 will increase the threshold voltage of the third period to, for example, the third threshold voltage VTH3 according to the comparing result that the phase voltage VL (e.g., the second threshold voltage VTH2) is smaller than the default voltage VD (e.g., the third threshold voltage VTH3). Although the off-time TB2 of the operation switch LS of the second period is still slightly earlier than the ideal off-time T02 of the second period, it has approached the ideal off-time more than that of the first period.

During the third period, the zero-current controller 444 will increase the threshold voltage of the third period to, for example, the third threshold voltage VTH3 according to the comparing result that the phase voltage VL (e.g., the second threshold voltage VTH2) is smaller than the default voltage VD (e.g., the third threshold voltage VTH3), so that the falling edge of the PWM signal LG is delayed to occur at the off-time TA3. Since the off-time TA3 of the operation switch LS of the third period is equal to the ideal off-time T03 of the third period, the error can be effectively minimized.

It can be obtained from the above that when the off-time of the operation switch LS is earlier than the ideal off-time of the first period, the zero-current controller 444 will continuously increase the threshold voltage during the following second period and third period, according the comparing result that the phase voltage VL is smaller than the default voltage VD, that is, the second threshold voltage VTH2 is greater than the first threshold voltage VTH1 and the third threshold voltage VTH3 is greater than the second threshold voltage VTH2 until the phase voltage VL is equal to the default voltage VD.

Another embodiment of the invention is a DC-DC converting controller operating method. In this embodiment, the DC-DC converting controller operating method is used for operating a DC-DC converting controller. The DC-DC converting controller is coupled to an output stage. The output stage includes a phase node and an operation switch (e.g., a lower bridge switch). The operation switch is coupled between the phase node and a ground voltage.

Figure 9:
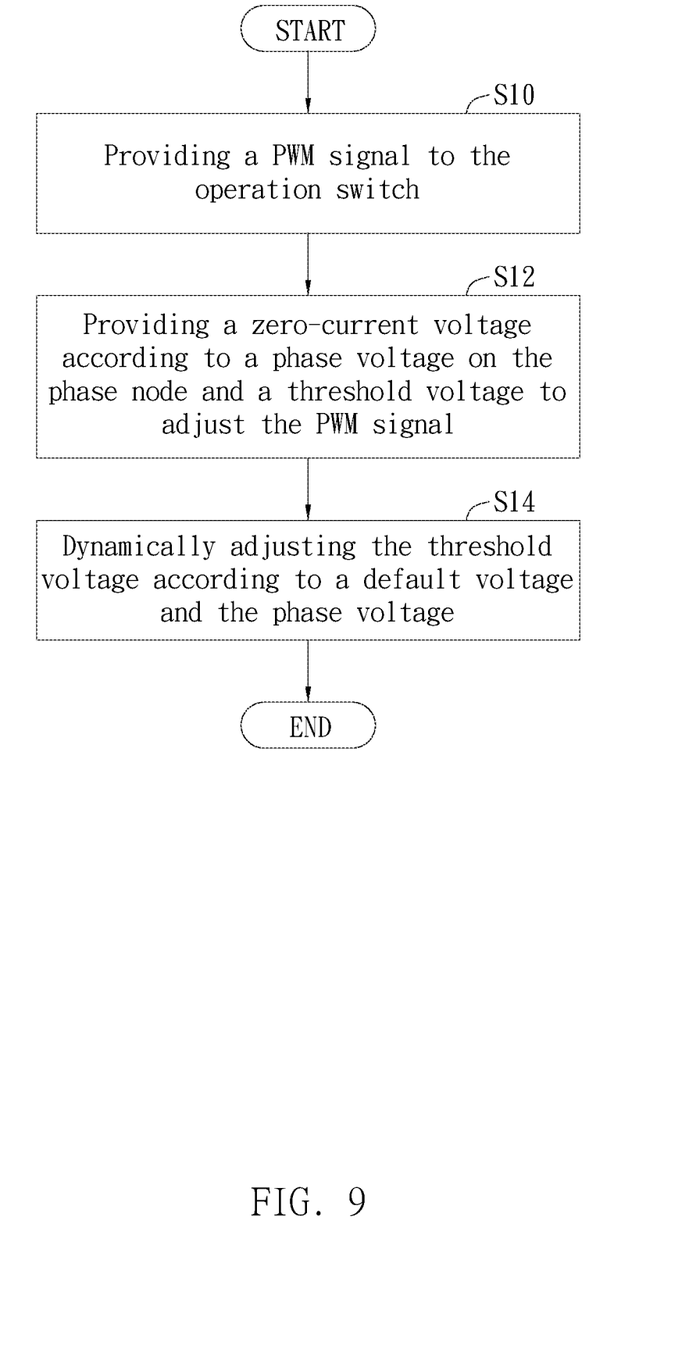
FIG. 9 illustrates a flowchart of the DC-DC converting controller operating method in another embodiment of the invention.

Please refer to FIG. 9. FIG. 9 illustrates a flowchart of the DC-DC converting controller operating method in this embodiment. As shown in FIG. 9, the DC-DC converting controller operating method can include:

the step S10: providing a PWM signal to the operation switch;

the step S12: providing a zero-current voltage according to a phase voltage on the phase node and a threshold voltage to adjust the PWM signal; and the step S14: dynamically adjusting the threshold voltage according to a default voltage and the phase voltage.

After the step S10, the PWM signal controls the operation switch to be periodically turned on and off, and the method can selectively adjust the threshold voltage of the next period (e.g., the second period) according to the phase voltage on the phase node of the previous period (e.g., the first period), wherein the second period is later than the first period.

In practical applications, the method can selectively adjust the threshold voltage of the next period (e.g., the second period) according to the comparing result between the phase voltage of the previous period (e.g., the first period) and the default voltage.

For example, when the phase voltage of the first period is greater than the default voltage, the method will decrease the threshold voltage of the second period; when the phase voltage of the first period is smaller than the default voltage, the method will increase the threshold voltage of the second period; when the phase voltage of the first period is equal to the default voltage, the method will not adjust the threshold voltage of the second period. Other periods can be deduced by analogy, so it will not be described here.

In practical applications, the method can also adjust the PWM signal according to a feedback voltage related to the output voltage, but not limited to this. In addition, the output stage further includes another operation switch (e.g., the upper bridge switch), and the another operation switch is coupled between the input voltage and the phase node. The method also provides another PWM signal to the another operation switch.

Compared to the prior art, the DC-DC converting controller and the operation method thereof according to the invention dynamically adjust the zero-current voltage of the next period according to the results of comparing the phase voltage on the phase node during the previous period with the default voltage, so that the transmission delay error during zero-current detection can be improved, and the power loss due to the too early or too late off-time of the switch in the prior art can be avoided; therefore, the ideal zero-current detection mechanism can be realized.

What is claimed is:

1. A DC-DC converting controller, coupled to an output stage, the output stage comprising a phase node and an operation switch, the operation switch being coupled between the phase node and a ground voltage, the DC-DC converting controller comprising:
   a pulse-width modulation (PWM) unit, coupled to the output stage, providing a PWM signal to the output stage to control the operation switch;
   a zero-level comparator having a first input terminal, a second input terminal and an output terminal, wherein the first input terminal is coupled to the phase node, the output terminal is coupled to the PWM unit and provides a zero-current voltage to adjust the PWM signal; and
   a threshold voltage generation unit, coupled to the phase node and the second input terminal of the zero-level comparator respectively, providing a threshold voltage to the second input terminal,
   wherein, the threshold voltage generation unit dynamically adjusts the threshold voltage according to a default voltage and a phase voltage on the phase node.

2. The DC-DC converting controller of claim 1, wherein the threshold voltage generation unit comprises a sampling unit, a comparator and a zero-current controller, the PWM signal controls the operation switch to be periodically turned on and off, the threshold voltage generation unit selectively adjusts the threshold voltage of a second period according to the phase voltage on the phase node during a first period, and the second period is later than the first period.

3. The DC-DC converting controller of claim 2, wherein when the phase voltage of the first period is greater than the default voltage, the threshold voltage of the second period decreases.

4. The DC-DC converting controller of claim 2, wherein when the phase voltage of the first period is smaller than the default voltage, the threshold voltage of the second period increases.

5. A DC-DC converting controller operating method used for operating a DC-DC converting controller, the DC-DC converting controller being coupled to an output stage, the output stage comprising a phase node and an operation switch, the operation switch being coupled between the phase node and a ground voltage, the DC-DC converting controller operating method comprising:
   (a) providing a PWM signal to the operation switch;
   (b) providing a zero-current voltage according to a phase voltage on the phase node and a threshold voltage to adjust the PWM signal; and
   (c) dynamically adjusting the threshold voltage according to a default voltage and the phase voltage.

6. The DC-DC converting controller operating method of claim 5, further comprising:
   the PWM signal controlling the operation switch to be periodically turned on and off; and
   selectively adjusting the threshold voltage of a second period according to the phase voltage on the phase node during a first period, wherein the second period is later than the first period.

7. The DC-DC converting controller operating method of claim 6, further comprising:
   when the phase voltage of the first period is greater than the default voltage, decreasing the threshold voltage of the second period.

8. The DC-DC converting controller operating method of claim 6, further comprising:
   when the phase voltage of the first period is smaller than the default voltage, increasing the threshold voltage of the second period.

* * * * *